Figure 1:
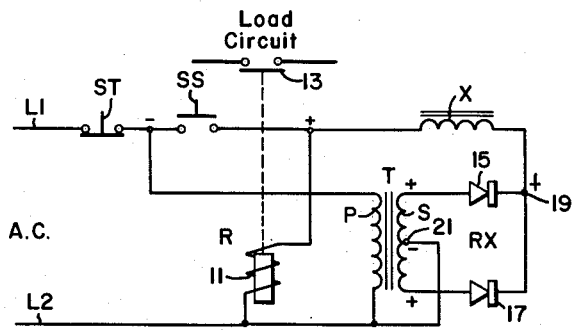

Jan. 23, 1962  A. W. HODGSON  3,018,421
A.C.-D.C. ELECTROMAGNET
Filed Feb. 26, 1959

INVENTOR
Alfred W. Hodgson
BY
ATTORNEY

United States Patent Office

3,018,421
Patented Jan. 23, 1962

3,018,421
A.C.-D.C. ELECTROMAGNET
Alfred W. Hodgson, Orchard Park, N.Y., assignor to Westinghouse Electric Corporation, East Pittsburgh, Pa., a corporation of Pennsylvania
Filed Feb. 26, 1959, Ser. No. 795,629
9 Claims. (Cl. 317—154)

This invention relates to the electrical control art, and has particular relationship to the control of electromagnetic devices, such as relays and contactors.

It has long been desirable to provide relay apparatus in the operation of which a relay is pulley in by supplying alternating current to its coil or solenoid and is held in by conducting direct current through the coil or solenoid and disconnecting the alternating current. Typical of attempts to provide such apparatus is the Perry Patent 1,717,247. But it has been found that such apparatus as is disclosed by Perry is unsatisfactory because of its tendency to be unstable and the rectifiers of the direct current supply may be damaged.

It is then an object of this invention to provide stable relay apparatus, in the operation of which a relay or contactor shall be pulled in by supplying alternating current to its coil and shall be held in with the alternating current disconnected by supplying direct current to its coil.

It is a further object of this invention to provide such apparatus which shall operate without damaging the direct current supply.

A more general object of this invention is to provide apparatus for supplying in succession alternating current and direct current to a winding without damaging the direct current supply during the transition from alternating current to direct current.

A specific object of this invention is to provide relay apparatus in the operation of which a relay or contactor having a standard single-winding magnet coil shall be actuated by alternating current and maintained in actuated condition by direct current with the alternating current disconnected.

This invention arises from the realization that the instability and the tendency to damage the direct-current supply of the prior-art apparatus results from the precise sequencing demanded in prior-art apparatus of the mechanical switch mechanisms which operate during the transition from alternating to direct current. The difficulties involved here may be understood by considering apparatus such as is disclosed in the Perry patent, assuming, as disclosed on page 1, right-hand column, lines 82 through 97, that the relay 10 has a single winding. In Perry, the alternating current is supplied through contact 20 and the direct current through contact 21, which is closed on the actuation of the relay. Stability demands that either one or the other, contact 20 or contact 21, or both must be closed during the whole interval of the transition from the alternating current to the direct-current operation. If, for example, contact 20 should open before contact 21 closes, relay 10 would tend to drop out returning contact 20 to the closed position which would again energize the coil and repeat the just described operation. The relay would then chatter. But the simultaneous closing of contacts 20 and 21 for any appreciable time intervals would result in the conduction of the high-voltage alternating-current which actuated the relay through the rectifiers 15 and 18 and damage to these rectifiers. The inconsistency of the arcing time at a contact such as 20 would militate against any precision control of the closing of the contacts in such manner that the simultaneous closing is for so short an interval as not to damage the rectifiers.

The precise sequencing of the closing of contact 21 and the opening of contact 20 is also precluded by the demand that the transition from alternating current to direct current must take place at a point in the travel of the armature of the relay at which the direct-current holding force is of adequate strength to pull the armature into the sealed position. This is not readily achieved in practice. The contact 21 in the hold circuit must have sufficient over-travel to develop adequate contact pressure and the air gap in the armature must be of sufficient length to permit this over-travel. The contact 21 then completes (but does not seal in) the holding circuit while the armature has traveled only over part of the gap. The remaining part of the gap is longer than that which would permit the holding direct-current to seal the relay. To avoid instability, the coil must then at this point in the operation be supplied with alternating current, which in circuit with the direct-current supply would damage the rectifiers.

In accordance with this invention, the direct-current supply is protected by including in the direct-current circuit reactive means which has high impedance to alternating current and a low resistance to direct-current. The reactive means reduces any alternating current which may flow through the direct-current supply and thus permits the alternating-current supply circuit to be maintained closed with the direct-current holding circuit also closed for as long as may be necessary to assure stable operation of the relay apparatus.

The novel features considered characteristic of this invention are disclosed generally above. The invention itself, both as to its organization and as to its method of operation, will be understood from the following description of specific embodiments taken in connection with accompanying drawing in which:

FIGURE 1 is a schematic of a preferred embodiment of this invention, and

Figure 2:
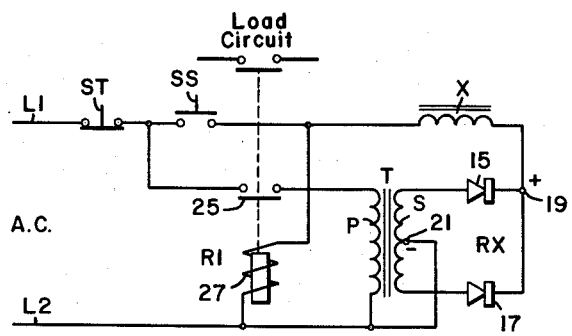
Figure 3:
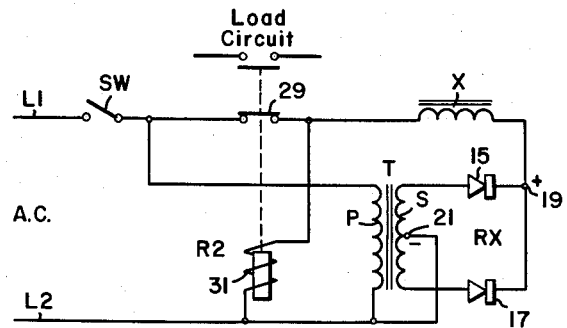
Figure 4:
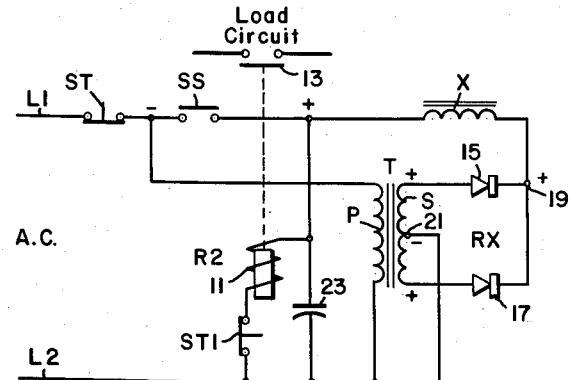

FIGURES 2, 3, and 4 are schematics of modifications of this invention.

The apparatus shown in FIGURE 1 includes an electromagnet which may be an ordinary relay or contactor R and which includes a coil 11 and contacts 13 to be closed when the relay R is actuated for the purpose of energizing a load circuit. It is to be understood that the relay may also have back contacts which may open the load circuit when the relay is actuated.

The coil 11 is to be supplied with alternating current from conductors L1 and L2, which are adapted to be connected through the usual disconnects or circuit breakers (not shown), to a commercial alternating-current supply, for example, of the 110 or 220 volt type. The voltage should be adequate to pull in the relay R when current is supplied to its coil 11. Conductors L1 and L2 are adapted to be connected to the coil 11 of the relay R through a normally closed stop pushbutton ST and a normally open start pushbutton SS.

Direct-current for holding the relay in actuated condition is suppied from a rectifier RX. This rectifier is energized from the transformer T, the primary P of which is connected between L1 and L2 through the pushbutton ST and the secondary S of which is connected to the rectifying elements 15 and 17 of the rectifier RX in the usual full-wave circuit. The apparatus shown in FIG. 1 also includes a reactor X. The direct-current terminals 19 and 21 of the rectifier RX are connected in series with the coil 11 of relay R through the reactor X.

In the standby condition of this apparatus, the conductors L1 and L2 are energized, energizing the transformer T. Direct-current is then supplied to the relay coil 11 through the reactor X, but this direct-current is of a magnitude incapable of picking up the relay R but capable of holding the relay picked up once it is actuated. The alternating-current circuit is open at pushbutton SS.

In the operation of the FIG. 1 apparatus, pushbutton SS is closed and alternating current is supplied to the coil 11 of relay R causing the relay to pick up and close the load circuit. While SS continues closed alternating current also flows through the rectifier elements 15 and 17 of RX in a forward direction when L2 is positive relative to L1 and in a reverse direction, limited by the back-resistances of 15 and 17, when L1 is positive relative to L2. At this time the potential across the rectifiers 15 and 17 is different because the potential across one-half of S adds to the potential between L1 and L2 and the potential across the other half of S subtracts from the potential between L1 and L2. To understand this assume that when L2 is positive relative to L1 the lower terminal of S is positive relative to the upper terminal. The voltage across 15 is then the voltage between L2 and L1 plus half the voltage across S less the drop across X. The voltage across 17 is the voltage between L2 and L1 less half the voltage across S less the drop across X. When L1 is positive relative to L2 the converse occurs but the current is substantially smaller. The magnitude of the alternating component of this current is substantially reduced by the reactor X so that the rectifier elements 15 and 17 are not damaged.

The direct-current component transmitted through the coil of relay R is substantially not affected by reactor X and is sufficient to hold the relay R actuated once the pushbutton SS is released.

When it is desirable to drop out the relay R, the pushbutton ST is opened, interrupting the supply of current to the transformer T and deenergizing the rectifier RX.

Where a time delay in the opening of the relay R is desired, this delay may be achieved by relating the coil 11 of the relay R and the reactor X so that the tendency of inductive current to flow from the relay and reactor through the rectifier RX after ST is opened maintains the relay actuated for the desired time interval. If necessary, a capacitor 23 may be added across the coil 11 as shown in FIG. 4. A push button ST1 may be included in circuit with the capacitor 23 and coil 11.

The apparatus shown in FIG. 2 differs from that shown in FIG. 1, in the circumstance that the relay R1 has auxiliary front contacts 25. The front contacts 25 maintain the primary circuit of transformer T opened in the standby condition of the apparatus. During operation when the button SS is closed, the relay R1 picks up, closing the auxiliary contacts 25 and energizing the transformer T so that holding direct current is supplied to the coil 27 from the rectifier RX. The operator holds the button SS closed long enough to assure that the relay R1 is sealed in by the direct current from RX. The flow of alternating current through the rectifier elements of RX does not damage these elements because the reactor reduces the alternating component of this current to a minimum. The reactor RX does not materially affect the holding direct current.

The apparatus shown in FIGURE 3 includes a relay R2 which has auxiliary back contacts 29. The operation of this apparatus is maintained by closing a switch SW, which may be a knife or toggle switch, in circuit with the auxiliary back contacts 29 and the coil 31. Once the switch SW is closed actuating current is supplied to the coil 31 of R2. This causes the back contacts 29 to open after the relay R2 has pulled in completely. The alternating-current supply circuit to the coil 31 of R2 is then opened, but the relay R2 is maintained sealed in by the current supplied by rectifier RX. The alternating current which flows through the rectifier elements 15 and 17 of RX through the back contacts 29 of R2 during the transition interval does not damage these elements because of the protection afforded by the reactor X.

While preferred embodiments of this invention have been disclosed herein, many modifications thereof are feasible. This invention is not to be restricted, except insofar as is necessitated by the spirit of the prior art.

I claim as my invention:

1. Relay apparatus including an electromagnet having a coil and operable means, said operable means on actuation of said electromagnet being operable from a first position to a second position, first means for supplying alternating current, second means for supplying direct-current, means connected to said coil for connecting said coil in energizing relationship with said first means, said electromagnet being actuated on energization of said coil by said alternating current of said first means, reactance means having a high impedance to alternating current and a low resistance to direct-current and means connected to said coil and to said reactance means for connecting said coil to said second means through said reactance means, energization of said coil by the direct-current of said second means being insufficient to actuate said electromagnet but being sufficient to hold said electromagnet actuated once it is actuated.

2. Relay apparatus including an electromagnet having a coil, first supply conductors for supplying alternating current, second supply conductors for supplying direct-current, a reactor, normally open self restoring switch means, means connecting in a first series circuit said first conductors, said coil and said switch means, said circuit being normally open at said switch means and being closed by the closing of said switch means, and means connecting in a normally closed circuit said coil, said reactor and said second conductors.

3. Relay apparatus including an electromagnet having a coil, conductors for supplying alternating current, a transformer having a primary and a secondary, a rectifier having alternating current input terminals and direct-current output terminals, a reactor, means connecting said primary in a closed energizing circuit with said conductors, normally-open switch means, means including said switch means connecting said coil in a circuit with said conductors, said circuit to be closed on the closing of said switch means, means connecting said input terminals to said secondary, and means including said reactor connecting said output terminals to said coil.

4. Relay apparatus including an electromagnet having a coil, conductors for supplying alternating current, a transformer having a primary and a secondary, a rectifier having alternating current input terminals and direct-current output terminals, a reactor, first normally-open switch means, second normally-open switch means, means connected to said coil and including said first switch means for connecting said coil in energizing relationship with said conductors, means connected to said primary and including said second switch means for connecting said primary in energizing relationship with said conductors, means responsive to the supply of energy to said coil from said conductors for closing said second switch means, means connecting said input terminals in energizing relationship with said secondary, and means including said reactor connecting said rectifier in current-supply relationship with said coil.

5. Relay apparatus including an electromagnet having a coil, conductors for supplying alternating current, a transformer having a primary and a secondary, a rectifier having alternating current input terminals and direct-current output terminals, a reactor, first normally-open switch means, second normally-closed switch means, means connected to said coil and including said first switch means and said second switch means for connecting said coil in energizing relationship with said conductors, means connected to said primary and including only said first switch means for connecting said primary in energizing relationship with said conductors, means responsive to the supply of energy to said coil from said conductors for opening said second switch means, means connecting said input terminals in energizing relationship with said secondary, and means including said reactor connecting said rectifier in current-supply relationship with said coil.

6. Relay apparatus including means for supplying alternating current, an electromagnet to be connected to said supply means to be energized thereby, said electromagnet including operable means to be actuated from a first position to a second position on said energization of said electromagnet, means for supplying direct-current, said direct current supplying means operating to supply said direct current with the said electromagnet disconnected from said alternating current supply means and the supply of alternating current by said alternating current supply means to said electromagnet interrupted, reactance means having a low direct-current resistance, and means including said reactance means for connecting said electromagnet to said direct-current supplying means, said direct-current being of insufficient magnitude to actuate said operable means from said first to said second position, but being sufficient to hold said operable means in said second position with said alternating current interrupted, once said operable means has been actuated by said alternating current.

7. Relay apparatus including means for supplying alternating current, an electromagnet including operable means to be actuated from a first position to a second position on energization of said electromagnet, first connecting means connected to said electromagnet for connecting said supplying means in alternating-current supply relationship with said electromagnet to energize said electromagnet, means for supplying direct current, reactance means having a low direct-current resistance, and second connecting means including said reactance means for connecting said direct-current supplying means in direct-current supply relationship with said electromagnet, said first connecting means metallically connecting said direct-current supplying means to conduct alternating current from said alternating current supplying means, said reactive means interposing a high impedance to the alternating current conducted by said direct-current supplying means, the direct-current supplied by said direct-current supplying means to said electromagnet being of insufficient magnitude to actuate said operable means from said first to said second position, but being sufficient to hold said operable means in said second position once said operable means has been actuated by said alternating current.

8. Relay apparatus including an electromagnet having a coil and operable means, said operable means on actuation of said electromagnet being operable from a first position to a second position, first supply means for supplying alternating current, second supply means for supplying direct-current, reactance means having a high impedance to alternating current and a low resistance to direct-current, first connecting means connected to said coil for selectively connecting and disconnecting said first supply means and said coil, said first supply means when connected to said coil being in energizing relationship with said coil and actuating said electromagnet, and second connecting means connected to said coil and to said reactance means for connecting said second supply means in energizing relationship with said coil through said reactance means, said second connecting means connecting said second supply means and said coil beginning at latest while said coil is still connected to said first supply means, said second supply means supplying direct-current insufficient to actuate said electromagnet but sufficient to hold said operable means in said second position once said electromagnet is actuated, said second connections operating to maintain said second supply means and said coil connected when said first supply means is disconnected from said coil.

9. Relay apparatus including a relay having a coil, alternating current supply means connected to said coil for actuating said relay, and direct-current supply means connected to said coil for holding said relay in actuated condition while said coil is disconnected from said alternating current supply means but only after said relay is actuated by said alternating current supply means the said apparatus being characterized by reactance means included in the connection between said coil and said direct-current supply means, said reactance means having a high impedance to alternating current and a low resistance to direct-current.

References Cited in the file of this patent
UNITED STATES PATENTS

| | | |
|---|---|---|
| 1,717,247 | Perry | June 11, 1929 |
| 1,792,859 | Mitchell | Feb. 17, 1931 |
| 1,901,628 | Brainard | Mar. 14, 1933 |
| 2,287,164 | Bowsher | June 23, 1942 |
| 2,486,240 | Armstrong | Oct. 25, 1949 |
| 2,735,966 | Dodd | Feb. 21, 1956 |
| 2,736,843 | Douglas | Feb. 28, 1956 |

FOREIGN PATENTS

| | | |
|---|---|---|
| 1,109,498 | France | Sept. 28, 1935 |